Aug. 19, 1924.
B. KIRBY
FILTER
Filed Sept. 26, 1923
1,505,898
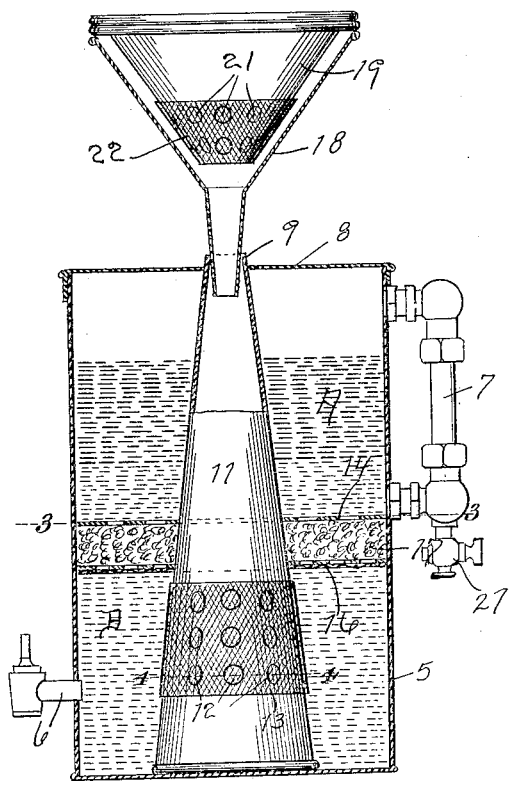
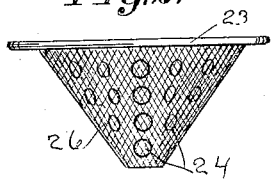
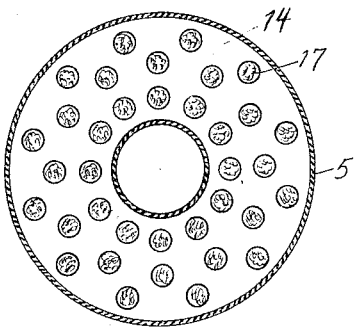
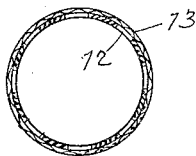
Inventor,
BARRY KIRBY
By Victor J. Evans
Attorney.

Patented Aug. 19, 1924.

1,505,898

UNITED STATES PATENT OFFICE.

BARRY KIRBY, OF LOS ALTOS, CALIFORNIA.

FILTER.

Application filed September 26, 1923. Serial No. 664,990.

*To all whom it may concern:*

Be it known that I, BARRY KIRBY, a citizen of the United States, residing at Los Altos, in the county of Santa Clara and State of California, have invented new and useful Improvements in Filters, of which the following is a specification.

This invention relates to new and useful improvements in filters for grease.

The principal object of this invention is to produce a simple device wherein grease can be separated and purified for use again.

Another object is to produce a device of this character which is simple in construction and therefore cheap to manufacture.

Other objects and advantages will be apparent during the course of the following description.

In the accompanying drawings forming a part of this specification, and in which like numerals are employed to designate like parts throughout the same, Figure 1 is a vertical cross section partly in elevation of my device, Figure 2 is a side elevation disclosing one of the filtering screens, Figure 3 is a horizontal section through the device, the view being taken on the line 3—3 of Figure 1, and Figure 4 is a similar section taken on the line 4—4 of Figure 1.

It often happens in cooking, that water in which the food is cooked contains considerable grease which is worth saving. I have therefore devised means whereby this grease may be readily saved without any trouble to the person doing the work.

In the accompanying drawings wherein for the purpose of illustration is shown a preferred embodiment of my invention, the numeral 5 designates a container of any convenient size. This container is provided with a draw-off cock 6 and with a gauge glass 7 secured near its upper end. This gauge glass is of the usual construction and has communication with the interior of the receptacle, and serves to indicate when to draw off the grease or water.

A cover 8 fits the receptacle and has a hole in the top thereof through which the upper end 9 of a cone 11 fits. This cone is perforated as shown at 12 and has a screen 13 positioned over the perforations. The bottom of this cone is closed, the purpose of which will be later seen.

Positioned upon the cone, at a point substantially mid-way of the height of the receptacle are two perforated plates 14 and 16 between which is positioned a sponge 17. It is obvious that any filtering material may be employed in place of the sponge.

Mounted in the end 9 of the cone 11 is a main funnel 18 having positioned therein an intermediate funnel 19 perforated as shown at 21, which perforations are covered by a screen 22. A top funnel 23 is shown in Figure 2 and is likewise perforated as at 24 and also has a screen wire cover 26.

In use the hot greasy water to be filtered is poured into the top funnel 23 and passes through the same, also through perforations of the intermediate funnel and into the main funnel 18 and discharges into the cone 11. By this time all of the large particles have been caught in the three funnels above referred to and any further sediment or particles will be retained in the bottom of the cone 11.

The liquid will pass out through the perforations 12 and due to the differences in specific gravity of the water and grease, the grease will rise contacting the perforated plate 16. The grease will gradually work its way up through the plate, thence through the sponge and thence through the plate 14 and finally rising to the top of the water.

The accumulated grease will assume the position shown at A in Figure 1, while the water will assume the position shown at B in Figure 1. It is of course understood that warm water is employed so that the grease will not become a solid mass.

The numeral 27 designates a draw off cock secured to the gauge which permits the pure grease to be drawn from the container.

By viewing the gauge glass, it will readily be seen how high the water level is and as more grease and water are poured in, some of the water may be withdrawn through the draw-off cock 6.

It will thus be seen that I have provided a very simple grease filter and one which will perform all of the functions set forth in the objects.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

A device of the character described comprising a receptacle, a cone-shaped member having an inlet at its reduced end and being closed at its large end, perforations formed in the side of said cone member, a screen positioned over said perforations, said cone-shaped member being centrally positioned within said receptacle and having its inlet adjacent the top of said receptacle, a funnel disposed into said inlet of said cone, a strainer mounted within said funnel, perforated plates mounted on said cone and spaced one from the other, said plates contacting the side walls of said receptacle, a filtering material positioned between said plates, and means for withdrawing fluid from said receptacle.

In testimony whereof I affix my signature.

BARRY KIRBY.